United States Patent Office 3,767,606
Patented Oct. 23, 1973

3,767,606
BLEND OF METHACRYLIC RESIN WITH ETHYLENE:VINYL ACETATE COPOLYMER-VINYL CHLORIDE GRAFT COPOLYMER
Hiroshi Kishikawa, Toyonaka, Kiyoshi Yasuno, Ibaraki, and Shuji Kitamura, Toyonaka, Japan, assignors to Sumitomo Chemical Company, Limited, Osaka-fu, Japan
Filed Apr. 21, 1971, Ser. No. 135,864
Claims priority, application Japan, Apr. 21, 1970, 45/34,454
Int. Cl. C08f 37/18
U.S. Cl. 260—23 AR                12 Claims

ABSTRACT OF THE DISCLOSURE

A thermoplastic resin composition excellent in transparency and resistance to impact which comprises a mixture containing about 1 to about 99% by weight of a methacrylic resin, and a balance of an ethylene:vinyl acetate copolymer-vinyl chloride graft copolymer wherein the ethylene:vinyl acetate copolymer component is dispersed in an "island state," admixed with from 0 to about 30 parts by weight of a vinyl chloride resin per 100 parts by weight of the mixture.

---

The present invention relates to a thermoplastic resin composition excellent in transparency and resistance to impact.

Polystyrene, methacrylic resin (e.g. poly alkyl methacrylate) and the like are known as colorless, transparent resins but have insufficient impact strength. In order to overcome this disadvantage, a rubbery substance may, for instance, be incorporated into polystyrene. The resultant resin composition, so-called "high-impact polystyrene," is considerably improved in impact strength, but there is a loss in the transparency which is inherent with polystyrene itself.

For providing a resin composition with good transparency and high impact strength, the incorporation into the composition of an additive material satisfying the following two requirements has heretofore been considered to be essential: (1) the additive material should be approximately miscible with the composition and (2) the additive material should be identical with the composition in refractive index. However, it is quite difficult to find a suitable combination of a resin composition and an additive material which satisfies these requirements, and only few combinations are known.

It has now been found that a resin composition comprising a methacrylic resin and an ethylene:vinyl acetate copolymer-vinyl chloride graft copolymer (hereinafter referred to as "EVA/VC graft copolymer") wherein the ethylene:vinyl acetate copolymer component is dispersed in an "island state" with or without a vinyl chloride resin is excellent both in transparency and in resistance to impact.

In accordance with this invention, it has also been found that the refractive index of the methacrylic resin or its mixture with the vinyl chloride resin is not necessarily required to be identical with that of EVA/VC graft copolymer. This is quite advantageous, in that the ratio of the ethylene:vinyl acetate copolymer component to the vinyl chloride component in EVA/VC graft copolymer is not critical to the present invention. Thus, the composition can be prepared so that it is widely varied in the properties other than transparency and impact strength. For instance, a composition having a high content of the ethylene:vinyl acetate copolymer component is provided with good softness. Furthermore, a composition abundant in the methacrylic resin component is beautifully lustrous and highly weather-resistant. Also, a composition having a large content of the vinyl chloride component possesses high resistance to chemical agents and excellent fireproofness.

Figure 1:
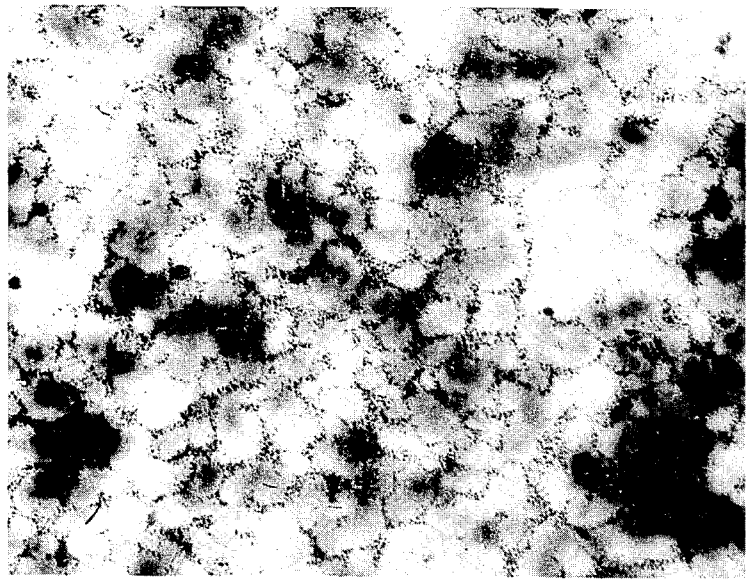
Figure 2:
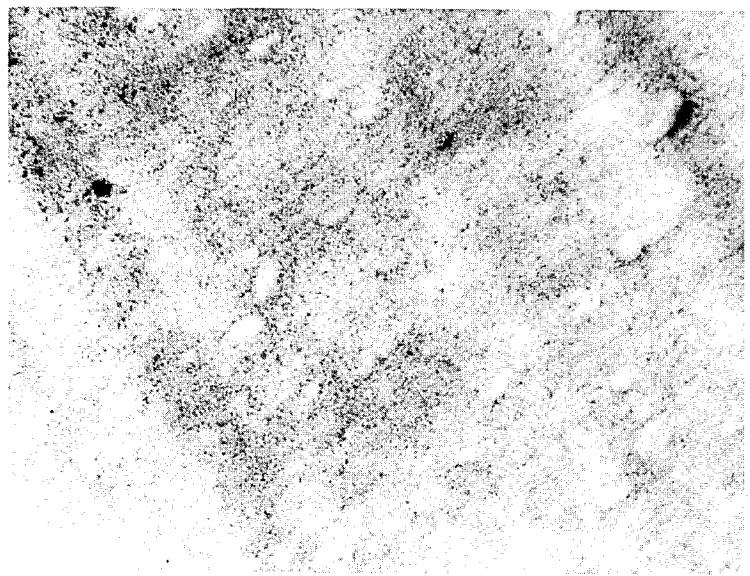

It is one of the characteristic features of the invention not to use a EVA/VC graft copolymer wherein the ethylene:vinyl acetate copolymer component is dispersed in a "net state," i.e. in latice-like arrangement (hereinafter referred to as "EVA/VC graft copolymer A") as shown in FIG. 1, but rather to use a EVA/VC graft copolymer wherein the ethylene:vinyl acetate copolymer component is dispersed in an "island state," i.e. in micro-sized particles or globules (hereinafter referred to as "EVA/VC graft copolymer B") as shown in FIG. 2. The particle size of the "island" is about 0.4 micron or less. As shown in Example 2 (which is hereinafter described in greater detail), the thermoplastic resin composition prepared by the use of EVA/VC graft copolymer B is much superior to that prepared by the use of EVA/VC graft copolymer A in transparency.

The composition of the present invention comprises about 100 parts by weight of a mixture containing about 1 to about 99% by weight of a methacrylic resin and about 99 to about 1% by weight of a EVA/VC graft copolymer wherein the ethylene:vinyl acetate copolymer component is dispersed in an "island state," and from 0 to about 30 parts by weight of vinyl chloride resin with a stabilizer for the vinyl chloride resin. A particularly effective mixture contains from about 20 to 60% by weight of the methacrylic resin and from about 40 to 80% by weight of the graft copolymer.

It will be understood that the quantitative limitations in the composition noted above are essential for assured realization of good transparency and high resistance to impact. When the quantitative relationship is outside these limits, at least one of the two properties, i.e. transparency and the resistance to impact, will become unsatisfactory.

The methacrylic resin to be used in the composition may be homopolymer or copolymer of one or more of alkyl methacrylates (e.g. methyl methacrylate, ethyl methacrylate, propyl methacrylate, butyl methacrylate and the like). There may be also incorporated small amounts of one or more of any other vinyl monomers such as styrene, acrylonitrile, N-allylmaleimide and alkyl acrylates (e.g. methyl acrylate, ethyl acrylate, propylacrylate, acrylate and the like). For example, these other vinyl monomers may constitute up to about 1 to 15% by weight of the copolymer. The melt index (determined according to ASTM D–1238–69T) of the methacrylic resin suitable for use in the present invention ranges from 0.1 to 100 g./10 min. at 210° C. under 10 kg. of load.

The EVA/VC graft copolymer B, suitable for the purposes of this invention, is solid under atmospheric conditions and comprises from about 1 to about 90% by weight of the ethylene:vinyl acetate copolymer component in which the content of the vinyl acetate component is from about 20 to about 90% by weight (the ethylene therefore comprising from about 80 to about 10% by weight of the copolymer) and 99 to 10% by weight of the vinyl chloride component, which is grafted thereon. It may be prepared, for instance, by adding vinyl chloride, or a mixture thereof with small amounts, e.g. 5% of any other monomer copolymerizable therewith, continuously or stepwise, to the ethylene:vinyl acetate copolymer under the reaction conditions for graft polymerization. This preparation procedure is described in detail in Japanese patent publication No. 14,228/1968. It may be also prepared, for instance, by dissolving the ethylene:vinyl acetate copolymer in vinyl chloride, or the mixture thereof with any other monomer copolymerizable therewith, and elevating the temperature continuously or stepwise under the reaction conditions for graft polymerization.

The vinyl chloride resin, which may be present in the composition, is solid under atmospheric conditions and may be homopolymer of vinyl chloride or copolymer of vinyl chloride with small amounts of one or more other vinyl monomers such as vinyl acetate, vinyl propionate, vinyl butyrate, vinyl laurate, ethyl acrylate, methyl methacrylate, allyl acetate, allyl chloride, allyl ethyl ether, vinylidene chloride, ethylene and propylene. Generally the copolymers contain above about 75% vinyl chloride, with the remainder of the polymer being made up of the other vinyl monomers. The degree of polymerization (determined according to JIS K-6727) of the vinyl chloride resin suitable for use in the present invention ranges from 400 to 2000.

As the stabilizer for vinyl chloride resin, there may be exemplified tin compounds, cadmium compounds, barium compounds, zinc compounds, epoxy compounds and their mixtures. These compounds are well known in the stabilization art. Specific examples of the stabilizer for vinyl chloride resin include dibutyl tin dilaurate, dibutyl tin maleate, mercapto tin, cadmium stearate, barium stearate, zinc stearate, butyl epoxy stearate, etc. The amount of the stabilizer used is usually from about 0.2 to about 20% by weight on the basis of the total amount of the vinyl chloride component in the composition. The vinyl chloride component on which the amount of the stabilizer is based includes the vinyl chloride in the EVA/VC graft copolymer B and, if used, that in vinyl chloride resin.

The composition of the invention can be readily produced from the above-described polymers and stabilizers by mixing them using a conventional mixing machine such as roll, Banbury mixer or extruder. In this case, additives such as dyestuffs, pigments, heat stabilizers and light stabilizers may be incorporated therein in such amounts that they have no influence on the transparency and resistance to impact of the resultant composition.

Preferred embodiments of the present invention are illustratively shown in the following examples wherein parts and percent are by weight. In the examples, the impact strength is determined by ASTM D-256-56T for Charpy impact strength and ASTM D-1822-61T for tensile strength, and the transparency is estimated by the light transmission and the haze measured on a test piece having a thickness of 1 mm. according to ASTM D-1003-52T.

EXAMPLE 1

This example illustrates preparation of an ethylene:vinyl acetate copolymer having vinyl chloride grafted thereto, and its use with polymethyl methacrylate. In an autoclave equipped with an agitator, vinyl chloride (300 parts), ethylene:vinyl acetate copolymer (trade name "Evatate R5010" manufactured by Sumitomo Chemical Co., Ltd.) (300 parts), polyvinyl alcohol (5 parts), α,α'-azobisisobutyronitrile (3 parts) and water (3300 parts) are charged, and the mixture is agitated at 60° C. for 6 hours whereby polymerization proceeds. Then, vinyl chloride (600 parts) is continuously added thereto at a rate of 4 liters per hour. The polymerization is completed in 14 hours after the initiation, and EVA/VC graft copolymer B is obtained. A specimen of the graft copolymer is buried in epoxy resin, cut in a section with a microtome, stained with osmium oxide and subjected to electron-microscopic observation whereby the dispersion of the ethylene:vinyl acetate component is an "island state" is recognized.

The EVA/VC graft copolymer B as above obtained is admixed with polymethyl methacrylate (trade name "Sumipex LG" manufactured by Sumitomo Chemical Co., Ltd.), 5 parts of a mercapto tin compound (trade name "KS-41" manufactured by Kyodo Yakuhin Co., Ltd.) per 100 parts of the vinyl chloride component are added thereto, and the resultant mixture is roll kneaded at 180° C. for 10 minutes. The resulting composition is pressed at 180° C. for 10 minutes to obtain a specimen for determining the physical properties.

The impact strength and the transparency are shown in Table 1.

TABLE 1

| EVA/VC graft copolymer:polymethyl methacrylate (weight ratio) | Charpy impact strength, kg. cm./cm.² | | Transparency, percent | |
|---|---|---|---|---|
| | With notch | Without notch | Light transmission | Haze |
| 80:20 | 12.3 | Not broken | 89.0 | 7.5 |
| 60:40 | 4.2 | do | 91.0 | 4.7 |
| 0:100 | 1.3 | 16.4 | 92.0 | 7.0 |

From the above table, it is seen that the composition of the invention shows a much higher impact strength than the polymethyl methacrylate control with keeping a nearly equal transparency to the control.

EXAMPLE 2

The improved results obtained by using the EVA/VC graft copolymer B are shown in this example. In an autoclave equipped with an agitator, vinyl chloride (300 parts), ethylene:vinyl acetate copolymer (trade name "Evatate R5010" manufactured by Sumitomo Chemical Co., Ltd.) (300 parts), polyvinyl alcohol (5 parts), α,α'-azobisisobutyronitrile (3 parts) and water (3300 parts) are charged, and the mixture is agitated at 70° C. for 5 hours whereby polymerization proceeds. Then, vinyl chloride (900 parts) is continuously added thereto at a rate of 4 l./hr. The polymerization is completed in 11 hours after the initiation, and a EVA/VC graft copolymer B is obtained.

For comparison, a EVA/VC graft copolymer A is produced in the same manner as above but charging vinyl chloride (1200 parts) all at once in an autoclave prior to the initiation of polymerization and carrying out the polymerization at 70° C. for 11 hours.

Each of the above obtained EVA/VC graft copolymers A and B is buried in epoxy resin, cut in a section with a microtome, stained with osmium oxide and subjected to electron-microscopic observation whereby the dispersions of the ethylene:vinyl acetate component in a net state (shown in FIG. 1) and in an "island state" (shown in FIG. 2) are respectively recognized therefor.

The EVA/VC graft copolymer A or B as above obtained and polymethyl methacrylate (trade name "Sumipex LG" manufactured by Sumitomo Chemical Co., Ltd.) are mixed together in a weight ratio of 70:30, 5 parts of a mercapto tin compound (trade name "KS-41" manufactured by Kyodo Yakuhin Co., Ltd.) per 100 parts of the vinyl chloride component are added thereto, and the resultant mixture is roll kneaded at 180° C. for 10 minutes. The resulting composition is pressed at 180° C. for 10 minutes to obtain a specimen for determining the physical properties.

The impact strength and the transparency are shown in Table 2:

TABLE 2

| EVA/VC graft copolymer | Tensile impact strength, kg. cm./cm.² | Transparency, percent | |
|---|---|---|---|
| | | Light transmittance | Haze |
| EVA/VC graft copolymer B | 180 | 90.0 | 6.4 |
| EVA/VC graft copolymer A | 140 | 78.7 | 13.8 |

From the above table, it is seen that the composition of the invention using EVA/VC graft copolymer B is more excellent than that using EVA/VC graft copolymer A in both strength and transparency.

EXAMPLE 3

One hundred parts of a mixture of EVA/VC graft copolymer B obtained in Example 2 and polymethyl methacrylate (trade name "Sumipex LG" manufactured by Sumitomo Chemical Co., Ltd,) in a weight ratio of 70:30 are admixed with 10 parts of vinyl chloride resin (trade name "Sumilit SX-7G" manufactured by Sumitomo Chemical Co., Ltd.), a mercapto tin compound (trade name "KS-41" manufactured by Kyodo Yakuhin Co., Ltd.) is added thereto at a rate of 5 parts to 100 parts of the vinyl chloride component, and the resultant mixture is roll kneaded at 180° C. for 10 minutes. The resulting composition is pressed at 180° C. for 10 minutes to obtain a specimen for determining the physical properties.

The tensile impact strength of the specimen is 160 kg. cm./cm.$^2$, which is several times higher than those of vinyl chloride resin alone (80 kg. cm./cm.$^2$) and polymethyl methacrylate alone (40 kg. cm./cm.$^2$). The transparency of the specimen is as follows: light transmission (percent), 89.5; haze (percent), 5.6. Thus, it is as transparent as polymethyl methacrylate itself.

EXAMPLE 4

In an autoclave equipped with an agitator, vinyl chloride (1800 parts), ethylene:vinyl acetate copolymer (trade name "Evatate R5010" manufactured by Sumitomo Chemical Co., Ltd.) (1200 parts), methylcellulose (9 parts), α,α'-azobisisobutyronitrile (1 part) and water (3000 parts) are charged, and the mixture is agitated while elevating the temperature from 55 to 80° C. at a rate of 3° C./hr. EVA/VC graft copolymer B is thus obtained. A specimen of the graft copolymer is buried in epoxy resin, cut in a section with a microtome, stained with osmium oxide and subjected to electron-microscopic observation whereby the dispersion of the ethylene:vinyl acetate component in an "island state" is recognized.

The EVA/VC graft copolymer B as above obtained is admixed with polymethyl methacrylate (trade name "Sumipex LG" manufactured by Sumitomo Chemical Co., Ltd.), 5 parts of a mercapto tin compound (trade name "KS-41" manufactured by Kyodo Yakuhin Co., Ltd.) per 100 parts of the vinyl chloride component are added thereto, and the resultant mixture is roll kneaded at 180° C. for 10 minutes. The resulting composition is pressed at 180° C. for 10 minutes to obtain a specimen for determining the physical properties.

The impact strength and the transparency are shown in Table 3:

TABLE 3

| EVA/VC graft copolymer:polymethyl methacrylate (weight ratio) | Charpy impact strength (with notch), kg. cm./cm.$^2$ | Transparency, percent | |
|---|---|---|---|
| | | Light transmission | Haze |
| 60:40 | 35.4 | 87.2 | 8.4 |
| 40:60 | 10.7 | 88.4 | 6.3 |

From the above table, it is seen that the composition of the invention shows an excellent transparency with a high impact strength substantially equal to that of an ABS resin, i.e. 10 to 25 kg. cm./cm.$^2$.

EXAMPLE 5

By the following the procedures used in the Examples 1 and 3, addition experiments are conducted in which the methacrylate resin and the EVA/VC graft copolymer B used in Example 1 are used to prepare compositions containing a mixture with lesser amounts of either the methacrylic resin or the EVA/VC graft copolymer, together with up to 30 parts by weight of the vinyl chloride resin employed in Example 3. Evaluation of these compositions shows that they exhibit higher impact resistance and transparency comparable to polymethyl methacrylate alone, that at least 1% by weight of either the resin or graft copolymer should be in the mixture, and that beneficial results are obtained when up to 30 parts of the vinyl chloride are used.

While the novel principles of the invention have been described, it will be understood that various omissions, modifications and changes in these principles may be made by one skilled in the art without departing from the spirit and scope of the invention.

What is claimed is:

1. A thermoplastic resin composition which comprises a mixture of about 1 to about 99% by weight of methacrylic resin, wherein the methacrylic resin is a homopolymer or a copolymer prepared by polymerizing at least one lower alkyl methacrylate, or a copolymer prepared by polymerizing at least one lower alkyl methacrylate and at least one other polymerizable vinyl monomer, and about 99 to about 1% by weight of ethylene:vinyl acetate copolymer-vinyl chloride graft copolymer wherein the ethylene:vinyl acetate copolymer component is dispersed in an island state and 0 to 30 parts by weight of vinyl chloride resin per 100 parts by weight of the mixture, the ethylene:vinyl acetate copolymer-vinyl chloride graft copolymer being prepared by one of (a) by dissolving ethylene:vinyl acetate copolymer in vinyl chloride or a mixture thereof with a small amount of any other vinyl monomer copolymerizable therewith and adding vinyl chloride or a mixture thereof with a small amount of any other vinyl monomer copolymerizable therewith continuously or stepwise to the reaction mixture and under the reaction condition for graft polymerization and (b) by dissolving ethylene:vinyl acetate copolymer in vinyl chloride or the mixture thereof with a small amount of any other vinyl monomer copolymerizable therewith and elevating the temperature continuously or stepwise from 55 to 80° C. under the reaction condition for graft polymerization.

2. A thermoplastic resin composition according to claim 1, wherein the ethylene:vinyl acetate copolymer-vinyl chloride graft copolymer is prepared by dissolving ethylene:vinyl acetate copolymer in vinyl chloride or a mixture thereof with a small amount of any other vinyl monomer copolymerizable therewith and adding vinyl chloride or a mixture thereof with a small amount of any other vinyl monomer copolymerizable therewith continuously or stepwise to the reaction mixture under the reaction condition for graft polymerization.

3. A thermoplastic resin composition according to claim 1, wherein the ethylene:vinyl acetate copolymer-vinyl chloride graft copolymer is prepared by dissolving ethylene:vinyl acetate copolymer in vinyl chloride or the mixture thereof with a small amount of any other vinyl monomer copolymerizable therewith and elevating the temperature continuously or stepwise under the reaction condition for graft polymerization.

4. A thermoplastic resin composition according to claim 1, which comprises about 0.2 to about 20% by weight of a stabilizer for vinyl chloride resin on the basis of the weight of the total vinyl chloride units contained in said composition.

5. A thermoplastic resin composition according to claim 4, wherein the stabilizer for vinyl chloride resin is a member selected from the group consisting of dibutyl tin dilaurate, dibutyl tin maleate, mercapto tin, cadmium stearate, barium stearate, zinc stearate and butyl epoxy stearate.

6. A thermoplastic resin composition according to claim 1, wherein the vinyl chloride resin is solid under atmospheric conditions and a homopolymer or a copolymer is prepared by polymerizing a major proportion of vinyl chloride with at least one other polymerizable vinyl monomer.

7. A thermoplastic resin composition according to claim 1, wherein the ethylene:vinyl acetate copolymer vinyl chloride graft copolymer is solid under atmospheric conditions and a polymer prepared by polymerizing about 1 to about 90% by weight of ethylene:vinyl acetate copolymer in which the content of the vinyl acetate component is about 20 to about 90% by weight; with about 99 to about 10% by weight of vinyl chloride based on the weight of the graft copolymer.

8. A thermoplastic resin composition according to claim 1, wherein the island state of said graft copolymer comprises a dispersion of micro-size particles of the ethylene:vinyl acetate copolymer component distributed as islands throughout a matrix of the graft vinyl chloride component.

9. A thermoplastic resin composition according to claim 1, wherein the particle size of each island of the ethylene:vinyl acetate copolymer component is 0.4 micron or less.

10. A thermoplastic resin composition according to claim 1, wherein the lower alkyl methacrylate is a member selected from the group consisting of methyl methacrylate, ethyl methacrylate, propyl methacrylate and butyl methacrylate.

11. A thermoplastic resin composition according to claim 1, wherein said vinyl monomer is selected from the group consisting of vinyl acetate, vinyl propionate, vinyl butyrate, vinyl laurate, ethyl acrylate, methyl methacrylate, allyl acetate, allyl chloride, allyl ethyl ether, vinylidene chloride, ethylene and propylene.

12. A thermoplastic resin composition according to claim 11, wherein a copolymer obtained by reacting vinyl chloride with a vinyl monomer containing above about 75% vinyl chloride, is used as said vinyl chloride resin.

References Cited
UNITED STATES PATENTS

| | | | |
|---|---|---|---|
| 3,432,576 | 3/1969 | Beer | 260—878 |
| 3,444,269 | 5/1969 | Beer | 260—876 |
| 3,358,054 | 12/1967 | Hardt et al. | 260—878 |
| 3,322,858 | 5/1967 | Coaker et al. | 260—876 |

JOHN C. BLEUTGE, Primary Examiner

J. SEIBERT, Assistant Examiner

U.S. Cl. X.R.

260—23 XA, 29.6 RB, 45.75 K, 45.8 A, 45.85, 876 R, 878 R